United States Patent
Komoriya et al.

(10) Patent No.: US 9,442,299 B2
(45) Date of Patent: Sep. 13, 2016

(54) DISPLAY PROCESSING APPARATUS, DISPLAY APPARATUS AND IMAGE PROCESSING METHOD

(71) Applicant: Sony Corporation, Tokyo (JP)

(72) Inventors: Yota Komoriya, Kanagawa (JP); Yasuhide Hyodo, Tokyo (JP); Keita Ishikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 175 days.

(21) Appl. No.: 14/308,085

(22) Filed: Jun. 18, 2014

(65) Prior Publication Data

US 2015/0009208 A1 Jan. 8, 2015

(30) Foreign Application Priority Data

Jul. 2, 2013 (JP) .................................. 2013-138789

(51) Int. Cl.
*G02B 27/22* (2006.01)
*H04N 13/04* (2006.01)

(52) U.S. Cl.
CPC ...... *G02B 27/2214* (2013.01); *H04N 13/0447* (2013.01)

(58) Field of Classification Search
None
See application file for complete search history.

(56) References Cited

U.S. PATENT DOCUMENTS

| | | | | |
|---|---|---|---|---|
| 2011/0316985 | A1* | 12/2011 | Ishikawa | G02B 27/2214 348/51 |
| 2012/0044330 | A1* | 2/2012 | Watanabe | G02B 27/2214 348/54 |

FOREIGN PATENT DOCUMENTS

JP 11-095168 4/1999

* cited by examiner

*Primary Examiner* — James A Thompson
(74) *Attorney, Agent, or Firm* — Dentons US LLP (57) ABSTRACT

There is provided a display processing apparatus including a largest phase viewpoint determining part configured to determine a largest phase viewpoint having the largest phase among viewpoint images at a plurality of viewpoint positions in a normal vision region for presenting a stereoscopic image, and a phase determining part configured to determine phases for the viewpoint images at the respective viewpoint positions so that the phase differences between the viewpoint images at the neighboring viewpoint positions are half or less of the phase at the largest phase viewpoint.

7 Claims, 10 Drawing Sheets

<WHEN N=8>

FIG.7

<WHEN N=9>

<RELATED ART>

<PRESENT TECHNOLOGY>

DISPLAY PROCESSING APPARATUS, DISPLAY APPARATUS AND IMAGE PROCESSING METHOD

CROSS REFERENCE TO RELATED APPLICATIONS

This application claims the benefit of Japanese Priority Patent Application JP 2013-138789 filed Jul. 2, 2013, the entire contents of which are incorporated herein by reference.

BACKGROUND

The present disclosure relates to a display processing apparatus, a display apparatus and an image processing method.

In recent years, efforts are moving ahead to develop a naked-eye stereoscopic liquid crystal display enabling the visual identification of stereoscopic images without a pair of special glasses as a stereoscopic image display apparatus enabling the visual identification of stereoscopic images. The naked-eye stereoscopic LCD includes a liquid crystal display and either a lenticular sheet composed of parallel cylindrical lenses or a parallax barrier, that is, a vertically striped light barrier.

The naked-eye stereoscopic LCD is capable of displaying individual parallax images varied with each viewing angle. This function allows the visual identification of a stereoscopic image with the naked eye, but on the other hand it causes a phenomenon called crosstalk in which an image that should be viewable in another viewing angle is slightly visible in addition to an image that should be primarily viewed. The crosstalk generates a twin image, and a noticeable twin image gives a sense of fatigue and discomfort to a user watching the stereoscopic image. To reduce a sense of fatigue and discomfort experienced by users, measures such as increased intervals between parallax images displayed on the LCD panel are proposed, as is disclosed for example in JP H11-95168A.

SUMMARY

A stereoscopic image display apparatus of JP H11-95168A described above includes affixed lenticular sheets composed of parallel cylindrical lenses, and is configured to cover every two pixels of the liquid crystal display with the cylindrical lenses of one lenticular sheet. The stereoscopic image display apparatus displays a parallax image for the left eye at one pixel of the two pixels in the LCD panel and a parallax image for the right eye at the other pixel to show a stereoscopic image. At this time, the gap between the two pixels is widened and a black display area is provided between them to suppress the occurrence of crosstalk in the stereoscopic image display apparatus.

Such a stereoscopic image display apparatus, however, relatively reduces the light emitting area of pixels and darken an image in the overall screen display. Moreover, black display areas provided between pixels cause gaps between the pixels to appear as black stripes.

The present disclosure proposes a new, improved display apparatus, display processing apparatus and display processing method capable of displaying a stereoscopic image that reduces a sense of fatigue and discomfort felt by a user watching it with the naked eye.

According to an embodiment of the present disclosure, there is provided a display processing apparatus including a largest phase viewpoint determining part configured to determine a largest phase viewpoint having the largest phase among viewpoint images at a plurality of viewpoint positions in a normal vision region for presenting a stereoscopic image, and a phase determining part configured to determine phases for the viewpoint images at the respective viewpoint positions so that the phase differences between the viewpoint images at the neighboring viewpoint positions are half or less of the phase at the largest phase viewpoint.

According to an embodiment of the present disclosure, there is provided a display apparatus including a largest phase viewpoint determining part configured to determine a largest phase viewpoint having the largest phase among viewpoint images at a plurality of viewpoint positions in a normal vision region for presenting a stereoscopic image, a phase determining part configured to determine phases for the viewpoint images at the respective viewpoint positions so that the phase differences between the viewpoint images at the neighboring viewpoint positions are half or less of the phase at the largest phase viewpoint, a display control part configured to generate the viewpoint images having respective phases determined by the phase determining part and to let the display unit display the viewpoint images, and a display unit configured to display the viewpoint images.

According to an embodiment of the present disclosure, there is provided a method of processing display, the method including determining a largest phase viewpoint having the largest phase among viewpoint images at a plurality of viewpoint positions in a normal vision region for presenting a stereoscopic image, and determining phases for the viewpoint images at the respective viewpoint positions so that the phase differences between the viewpoint images at the neighboring viewpoint positions are half or less of the phase at the largest phase viewpoint.

According to one or more of embodiments of the present disclosure, phases for viewpoint images at respective viewpoint positions are determined so that the phase differences between the viewpoint images at the neighboring viewpoint positions are half or less of the phase at the largest phase viewpoint. This means that making phase differences between neighboring viewpoint images as uniform as possible enables image degradation to be less noticeable and a proper stereoscopic image to be viewed with the naked eye even in cases where a user watching the stereoscopic image moves his/her head.

As described above, one or more of embodiments of the present disclosure provides a stereoscopic image that reduces a sense of fatigue and discomfort felt by a user watching it with the naked eye.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Explanation will be given in the following order.
1. Outline of the present technology
  1.1 General description of naked-eye 3-D display
  1.2 General description of image display processing according to an embodiment of the present technology
2. Functional configuration of naked-eye 3-D display
3. Process for setting the positions of viewpoint images
4. Example
5. Conclusion

1. OUTLINE OF THE PRESENT TECHNOLOGY

1.1 General Description of Naked-Eye 3-D Display

Figure 1:
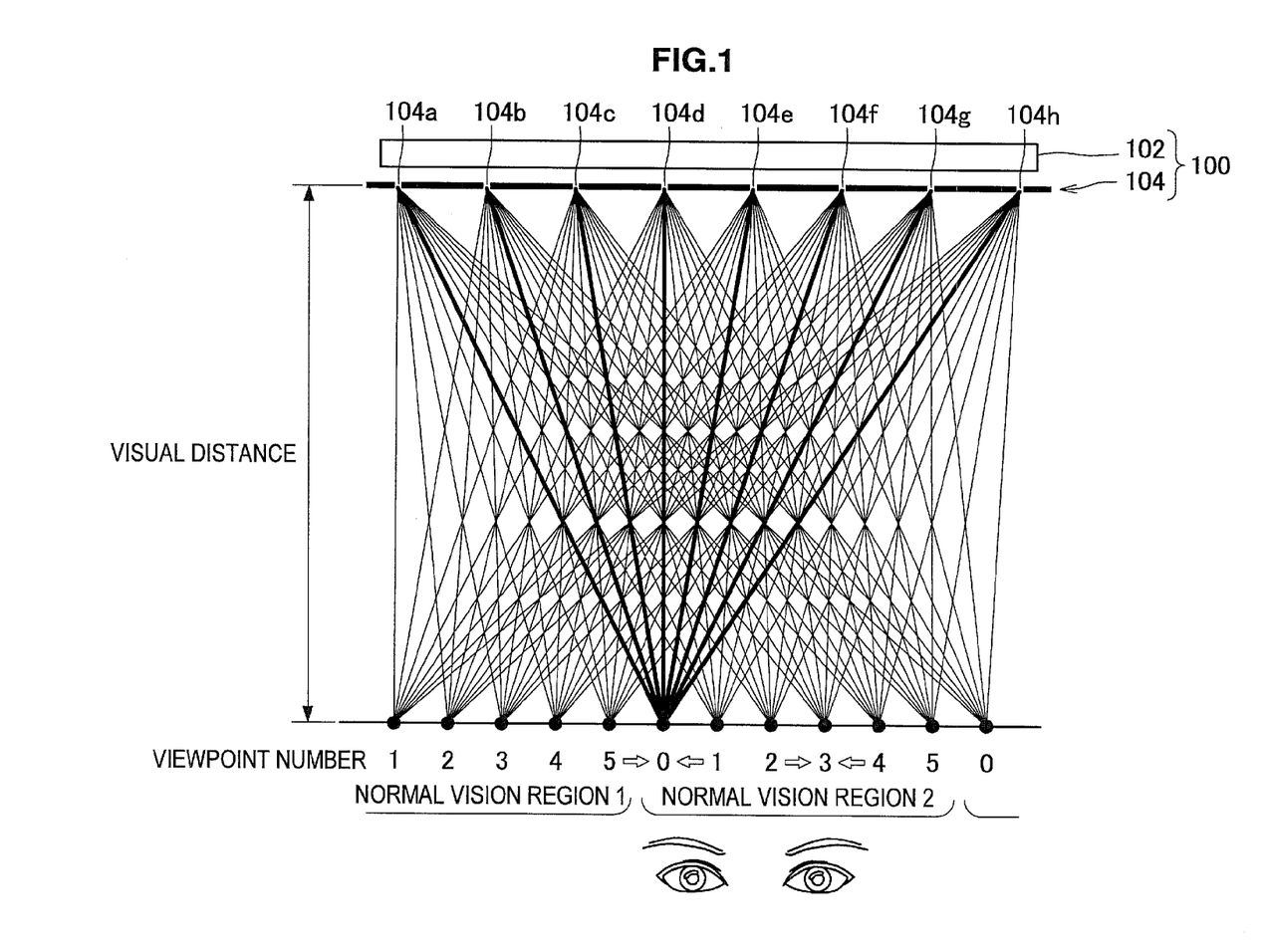
FIG. 1 is an explanatory drawing showing a schematic configuration of a naked-eye 3-D display according to an embodiment of the present disclosure.

With reference to FIG. 1, a schematic configuration of a naked-eye 3-D display 100, that is, a display apparatus according to an embodiment of the present disclosure is explained. FIG. 1 is an explanatory drawing showing a schematic configuration of a naked-eye 3-D display 100 according to the present embodiment.

The naked-eye 3-D display 100 is truly innovative in that the user is allowed to watch a stereoscopic image without wearing a pair of dedicated glasses. Such a naked-eye 3-D display 100 includes, for instance, an image display unit 102 and a barrier 104, that is, a parallax device, as shown in FIG. 1.

The image display unit 102 is a display apparatus generating images created for the right eye and images created for the left eye, and may be composed of an active matrix liquid crystal display panel. The naked-eye 3-D display 100 uses a parallax device to split the traveling directions of light beams emitted from the image display unit 102 so as to separate images for the right eye from images for the left eye.

The parallax device controls the traveling directions of light beams emitted from the image display unit 102 to condense individual viewpoint images at a designated design visual distance from the display surface of the image display unit 102. For example, the barrier 104 having a plurality of openings 104a through 104h as shown in FIG. 1 can be used as a parallax device. The openings 104a through 104h of the barrier 104 control the traveling directions of light beams emitted from the image display unit 102. This allows separate pictures to be formed each on the right eye and the left eye of a user watching the stereoscopic image. Instead of the barrier 104 shown in FIG. 1, a lens or an equivalent that condenses individual viewpoint images at a designated design visual distance from the display surface of the image display unit 102 may be used as a parallax device.

1.2 General Description of Image Display Processing According to an Embodiment of the Present Technology Such a naked-eye 3-D display 100 disposes a plurality of viewpoint images having different parallaxes at a condensing distance (visual distance) between the naked-eye 3-D display 100 and the user's eyes to form a single normal vision region, as shown in FIG. 1. Each viewpoint number in FIG. 1 indicates the display position of each viewpoint image in a normal vision region. Normal vision regions are successively disposed parallel to the display surface of the image display unit 102 so that a set of viewpoint images appear periodically. Disposing a plurality of normal vision regions in this manner allows a plurality of users to watch a stereoscopic image at the same time.

The naked-eye 3-D display 100 shown in FIG. 1, on the other hand, generates a reversed vision phenomenon in which viewpoint images in neighboring normal vision regions get into the left and right eyes of a user in cases, for example, where the user moves his/her head horizontally in a design visual distance. In particular, the naked-eye 3-D display 100 has a higher rate of occurrence of so-called crosstalk where a separated image signal that should be invisible gets into an image that should be visible than the glasses method does.

A reversed vision phenomenon generated by crosstalk can be remedied by use of, for example, a viewpoint image inside the normal vision region as a viewpoint image at the end of the normal vision region, but image degradation ensues. This is because the correlation between neighboring viewpoint images on either side of a viewpoint image in the boundary between neighboring normal vision regions is lowest, thus the crosstalk degrades the viewpoint image at the maximum. For example, as shown in FIG. 1, the correlation between the viewpoint image at the viewpoint number 5 in the normal vision region 1 that gets into the left eye and the viewpoint image at the viewpoint number 1 in the normal vision region 2 that gets into the right eye of a user at the viewpoint number 0 is lowest. Thus, a stereoscopic image looks relatively doubled or blurred for a user at the viewpoint number 0, compared to what it looks, for example, at the viewpoint number 3 having a relatively high correlation.

Users easily feel noticeable image degradation when viewpoint images having different degrees of degradation are seen during switching of a viewpoint image getting into the eye at the traveling of the viewpoint. Since the naked-eye 3-D display 100 does not have to fix the user's view position and the view position may travel even in a normal vision region, such image degradation hinders proper viewing of stereoscopic images.

Accordingly, the naked-eye 3-D display 100 according to the present embodiment, arranges each viewpoint so that the phase difference between the neighboring viewpoint images is half or less than the largest phase. With a viewpoint having the largest phase designated as a vertex, phases are allocated evenly so as to keep the phase difference between the neighboring viewpoint images at each viewpoint as constant as possible. Here, "phase" is a value representing a difference in the appearance of a viewpoint image viewed from each viewpoint with respect to a standard viewpoint. For example, when a viewpoint image at the viewpoint number 0 in the normal vision region 2 in FIG. 1 is taken as standard, a viewpoint image at another viewpoint number shows an angular difference in appearance compared to the viewpoint image at the viewpoint number 0. The present embodiment represents the degree of the difference as a phase. When the phase difference is zero, the appearance of the viewpoint image is identical. Larger the phase difference, larger the difference in the appearance of the viewpoint image.

Figure 2:
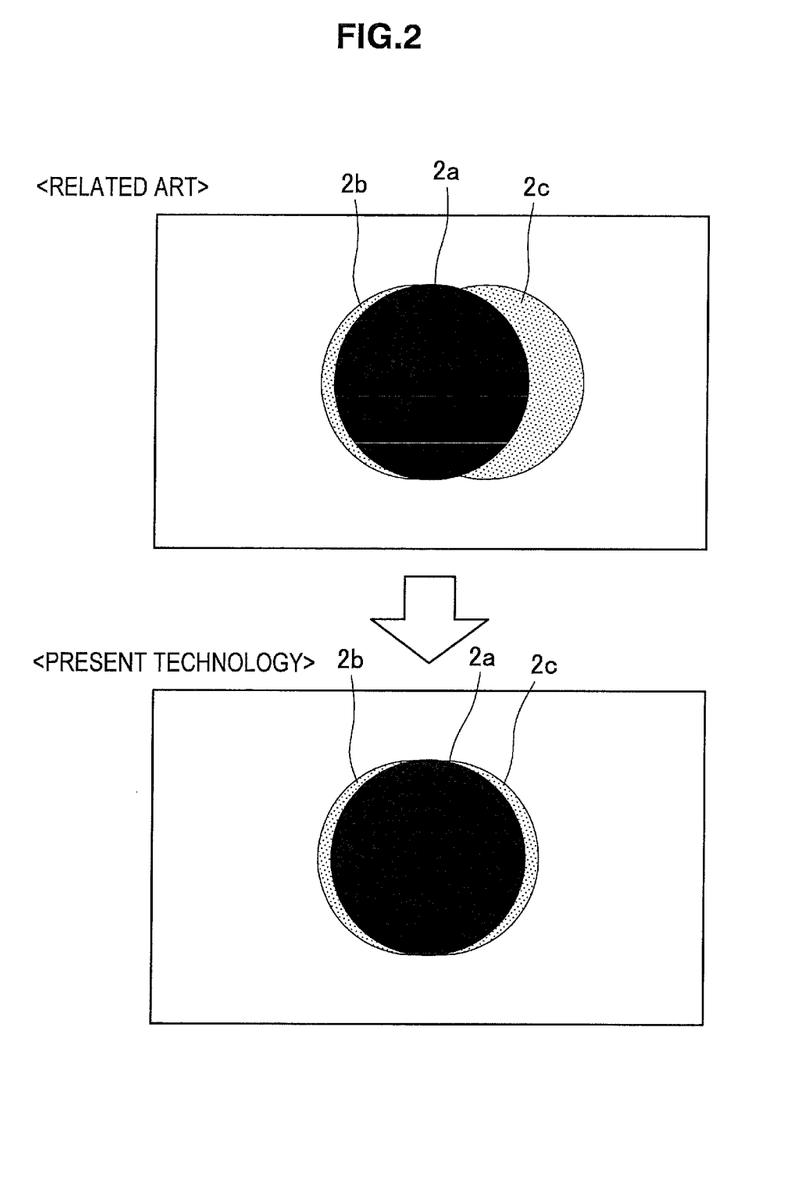
FIG. 2 is a conceptual drawing illustrating an effect given by image display processing according to the embodiment.

In related art, as shown in the upper side of FIG. 2, the correlation between neighboring viewpoint images is low and the phase difference between images 2b and 2c that constitute a stereoscopic image 2a is large. Consequently, the stereoscopic image looks doubled. In contrast, image display processing according to the present embodiment, as shown in the lower side of FIG. 2, makes the correlation between the neighboring viewpoint images higher and the phase difference between the images 2b and 2c that constitute the stereoscopic image 2a smaller, causing the twin image to be barely noticeable. Thus, making image degradation resulting from crosstalk by neighboring images at each viewpoint image as equal as possible causes discomfort owing to image degradation to be reduced, allowing the user to comfortably watch a stereoscopic image with the naked eye.

2. FUNCTIONAL CONFIGURATION OF NAKED-EYE 3-D DISPLAY

Figure 3:
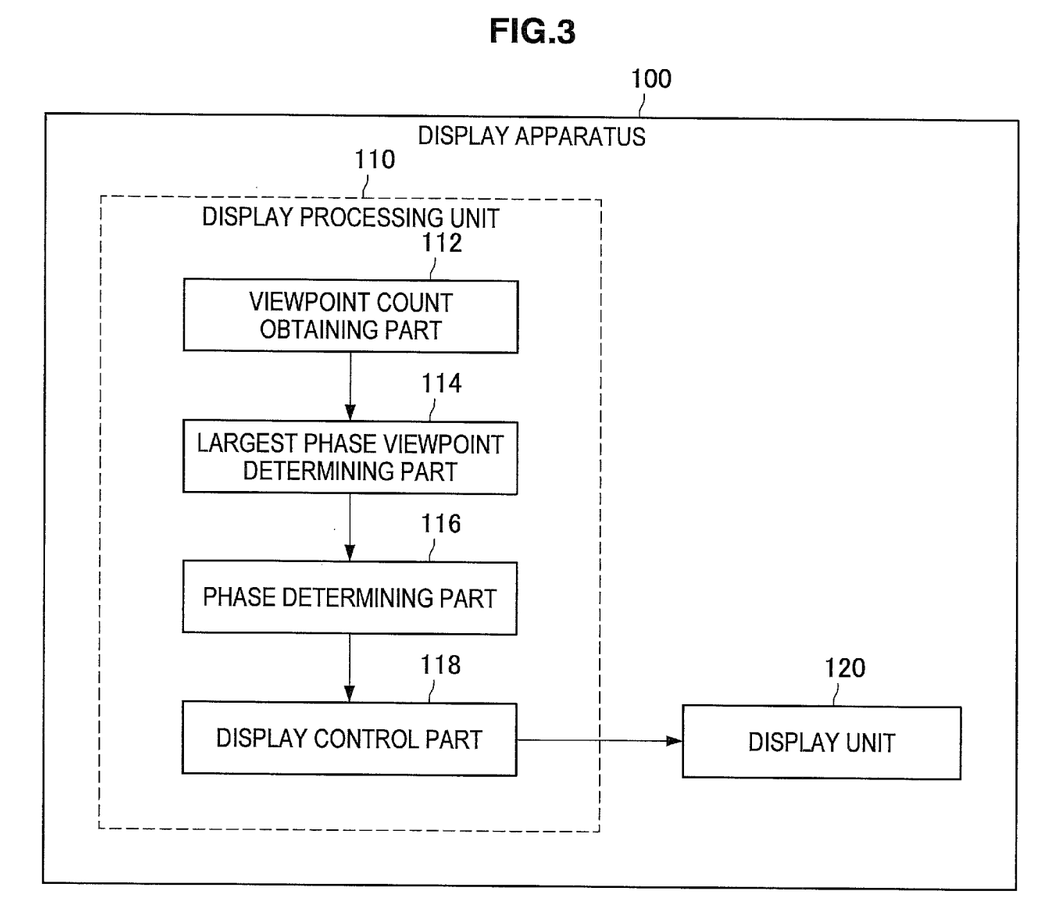
FIG. 3 is a functional block diagram illustrating a functional configuration of a naked-eye 3-D display according to the embodiment.

With reference to FIG. 3, a functional configuration of a naked-eye 3-D display 100 according to an embodiment of the present disclosure is explained. FIG. 3 is a functional block diagram illustrating a functional configuration of a naked-eye 3-D display 100 according to the present embodiment.

The naked-eye 3-D display 100, that is, a display apparatus according to the present embodiment includes a display processing unit 110 and a display unit 120, as shown in FIG. 3. The display processing unit 110 is a function part for performing image display processing to provide stereoscopic images, and controls the display of an image shown in the display unit 120. The display processing unit 110 functions, for example, as an arithmetic processing unit and a controller, and implements these functions with a CPU that controls entirely or partially the operation of the naked-eye 3-D display 100 in accordance with each program recorded on a ROM, RAM and the like. The display unit 120 displays an image in dependence upon display control performed by the display processing unit 110 to provide a user with the stereoscopic image. The display unit 120, for example, includes the image display unit 102 and the barrier 104 shown in FIG. 1.

The display processing unit 110 according to the present embodiment performs signal processing to present a multi-viewpoint image and sets the position of a virtual camera image for presentation, that is, viewpoint images. Each viewpoint image may be, for example, a viewpoint image created from a LR input image, or a viewpoint image created by another creation method in which stereoscopic images are rendered. To execute the process, the display processing unit 110 includes, for example, a viewpoint count obtaining part 112, a largest phase viewpoint determining part 114, a phase determining part 116 and a display control part 118, as shown in FIG. 3.

The viewpoint count obtaining part 112 in the naked-eye 3-D display 100 obtains the number of viewpoint images (hereinafter referred to also as "viewpoint count") at viewpoint positions in a single normal vision region. The naked-eye 3-D display 100, for example, presets a viewpoint count and stores it in a storage part (not shown). The viewpoint count obtaining part 112 outputs the obtained viewpoint count to the largest phase viewpoint determining part 114.

The largest phase viewpoint determining part 114 determines a largest phase viewpoint A having the largest phase difference against a viewpoint having the smallest phase difference among viewpoints. A process for determining the largest phase viewpoint A will be described in detail below. The largest phase viewpoint determining part 114 outputs the determined largest phase viewpoint A to the phase determining part 116.

The phase determining part 116 determines the phase of each viewpoint based on the largest phase viewpoint A. The phase determining part 116 determines the phase of each viewpoint so that the phase difference between the neighboring viewpoint images is half or less of the phase at the largest phase viewpoint A. Then, the phase determining part 116 evenly allocates phases for individual viewpoints with the largest phase viewpoint A designated as a vertex so that the phase difference between the neighboring viewpoint images at each viewpoint becomes as uniform as possible. A process for determining the phase of each viewpoint will be described in detail below. The phase determining part 116 outputs the determined phase for each viewpoint to the display control part 118.

The display control part 118 generates a signal for displaying a viewpoint image corresponding to the phase of each viewpoint and outputs the signal to the display unit 120. The display unit 120 is driven based on the signal to display the viewpoint image for the phase set at each viewpoint.

3. PROCESS FOR SETTING THE POSITIONS OF VIEWPOINT IMAGES

Hereinafter, a process for setting the positions of viewpoint images by a display processing unit 110 according to an embodiment of the present disclosure will be described with reference to FIGS. 4 to 9.

Figure 4:
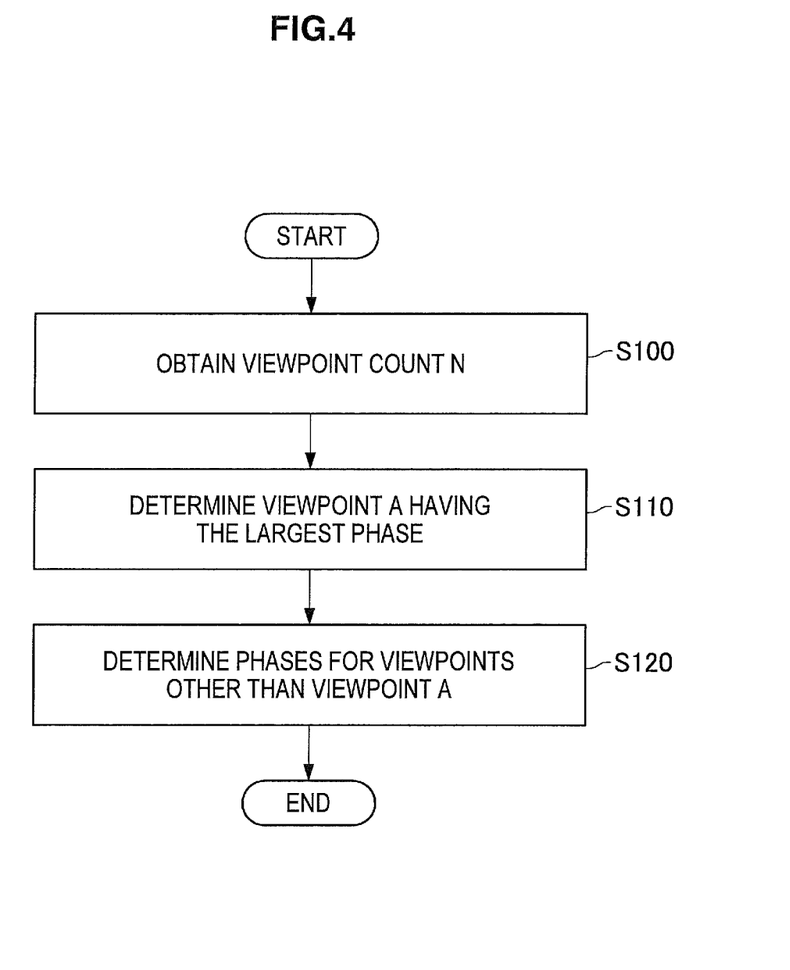
FIG. 4 is a flowchart showing a process of setting the positions of viewpoint images by an image processing unit according to the embodiment.

FIG. 4 is a flowchart showing a process of setting the positions of viewpoint images by the image processing unit 110 according to the present embodiment. First, the viewpoint count obtaining part 112 of the display processing unit 110 in the naked-eye 3-D display 100 obtains the number of viewpoint images n that constitute a normal vision region (S100). A viewpoint count n is preset by the naked-eye 3-D display 100 and the obtained viewpoint count n is output to the largest phase viewpoint determining part 114.

Next, the largest phase viewpoint determining part 114 determines a largest phase viewpoint A having the largest phase (S110). The largest phase viewpoint A is calculated by a function represented by the following equation (1). The equation (1) is a function that outputs the lowest integer greater than or equal to a real number.

$$A = \lceil \alpha n \rceil \quad (1)$$

Wherein a is a parameter to set the largest phase viewpoint A ($0 < \alpha \leq 1$). The equation (1) gives a viewpoint number A having the largest phase among a viewpoint count n. Note that the largest phase viewpoint A is a value smaller than n−1. The viewpoint number having the smallest phase among the viewpoint count n is specified as 0.

A phase at the viewpoint number 0 is calculated to be 0 by the equation (1) above, and the phase of the viewpoint number 0 is taken as standard. The present technology, however, does not necessarily set the viewpoint number 0 as a standard. In some displays, for example, the viewpoint number supposed to be standard may be altered to another to shift the normal vision position so that the view position causing reversed vision is shifted. Alternatively, a detecting device with a head-tracking or eye-tracking feature capable of detecting the position of a user watching a stereoscopic image may be combined with the naked-eye 3-D display 100 to shift the normal vision region so as to avoid reverse vision.

With the coefficient α as 0.5, the viewpoint image having the largest phase is positioned at around the center of a viewpoint count n. For example, when the α is 0.5, the largest phase viewpoint A for 8 viewpoints is calculated as 4 by the equation (1), and the largest phase viewpoint A for 9 viewpoints is 5 after the real number is rounded up to an integer by the equation (1).

It is preferred that the coefficient α should be 0.5 because positioning the viewpoint image having the largest phase at around the center of a viewpoint count n enables the phase differences between the neighboring viewpoint images to be nearly uniform. The present technology, however, is not limited to the example. The coefficient α may be larger or smaller depending on the balance between an actual naked-eye 3-D display 100 and the vision range.

Figure 5:
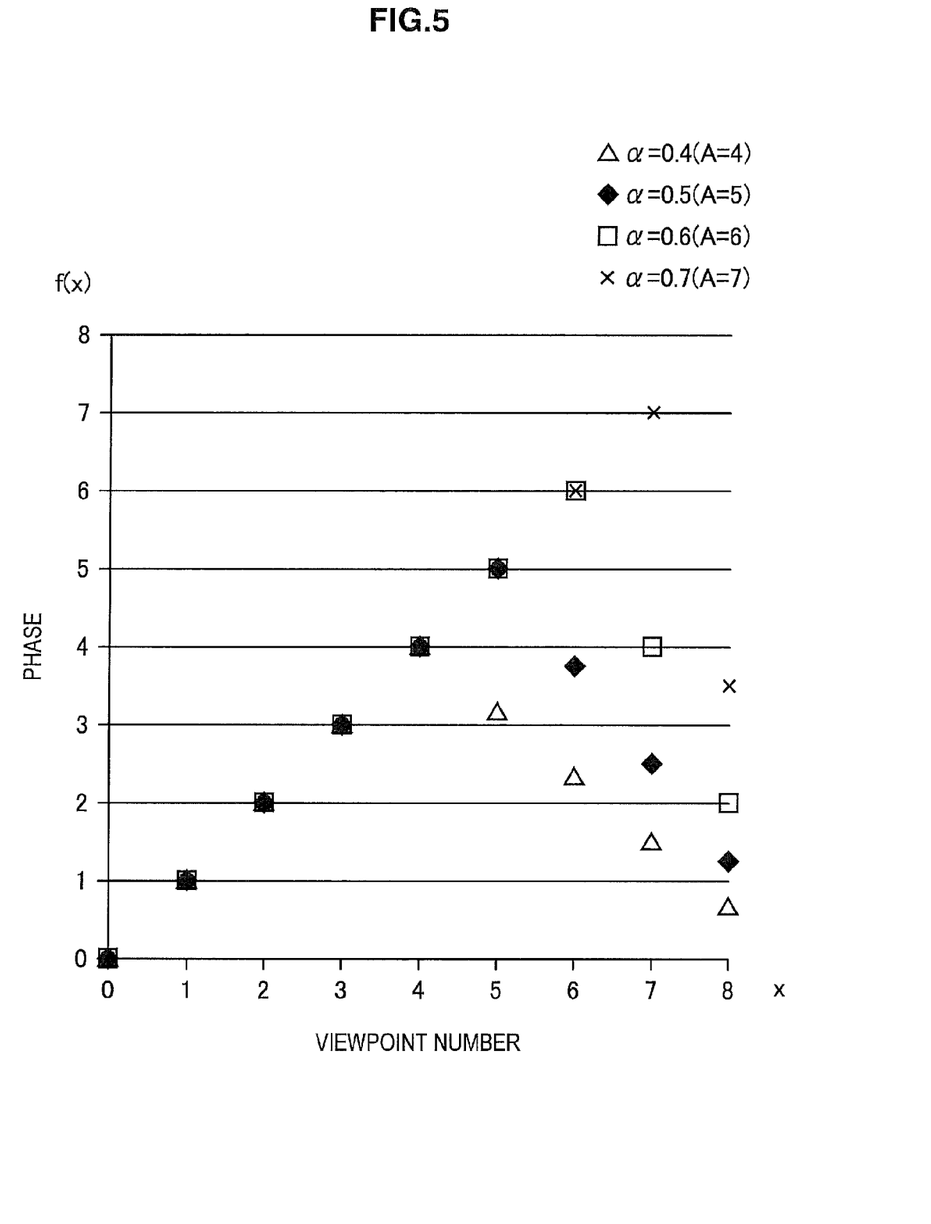
FIG. 5 is a graph illustrating the change of the largest phase viewpoint A for 9 viewpoints as the coefficient α varies.

FIG. 5 illustrates the change of the largest phase viewpoint A for 9 viewpoints as the coefficient α varies. As shown in FIG. 5, the largest phase viewpoint A increases with the coefficient α increasing. Increasing the coefficient α has an effect to expand the normal vision region. On the other hand, when the coefficient α is set, for example, to 0.6 shifted from 0.5, the phase differences for the viewpoint images that lead up to the largest phase viewpoint A are surpassed by the phase difference for any viewpoint image at a viewpoint number x greater than the largest phase viewpoint A, thus causing a difference in the degree of image degradation. For this reason, a larger coefficient α makes easier for users to notice image degradation. Preferably, the coefficient α should be set as appropriate on the basis of such a characteristic.

After the largest phase viewpoint A has been determined at the step S110, the phase determining part 116 determines a phase for each viewpoint (S120). The phase f (x) at each viewpoint x is calculated by the following equation (2). The viewpoint x that represents its viewpoint number takes integers from 0 to n−1.

$$f(x) = \begin{cases} px & \ldots \ x \leq A \\ pA\left(1 - \dfrac{x - A - (t-1)}{n - A - (t-1)}\right) & \ldots \ x > A \end{cases} \quad (2)$$

Wherein p is a phase difference between neighboring viewpoints, and t is the number of consecutive vertexes and takes integers between 1 and n−1−A.

For example, the phase difference between neighboring viewpoints p may be set to 1 as a dimensionless phase difference. Assuming that the phase difference between viewpoint images is the interval between neighboring virtual camera positions, the degree of the phase difference p may be defined based on the distance between left and right cameras for a multi-viewpoint image created from a LR input image. The present technology, however, is not limited to the example. The phase difference p between neighboring viewpoint images may be set based on the distance between neighboring virtual cameras specified by another method.

The number of consecutive vertexes t takes natural numbers smaller than n−A. When the number of consecutive vertexes t is 1, the phase arrangement has one vertex and when the number of consecutive vertexes t is 2 or above, a plurality of viewpoints having the largest phase are set.

According the equation (2) above, the phase increases monotonously while the viewpoint x is no greater than the largest phase viewpoint A. With the viewpoint x exceeding the largest phase viewpoint A, the phase decreases linearly toward a viewpoint number 0 in a normal vision region next to the current region while the viewpoint number x progresses one by one.

Figure 6:
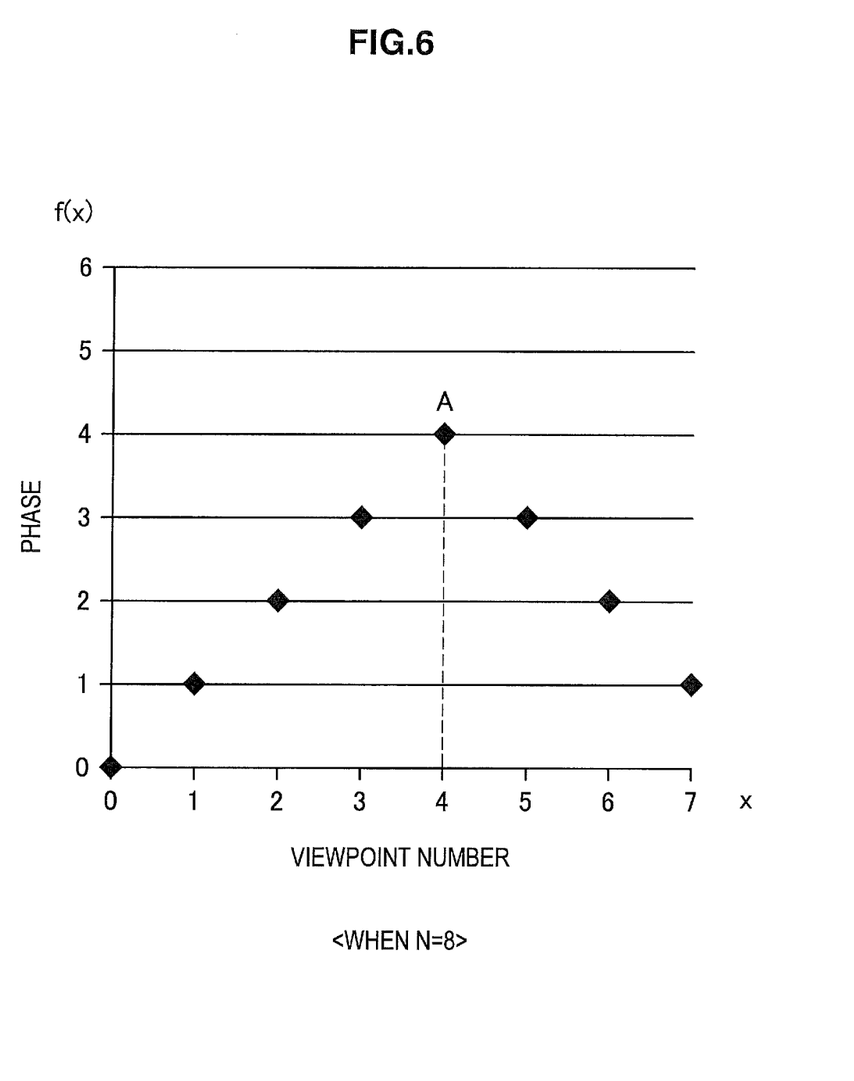
FIG. 6 is a graph illustrating phases at 8 respective viewpoints.
Figure 7:
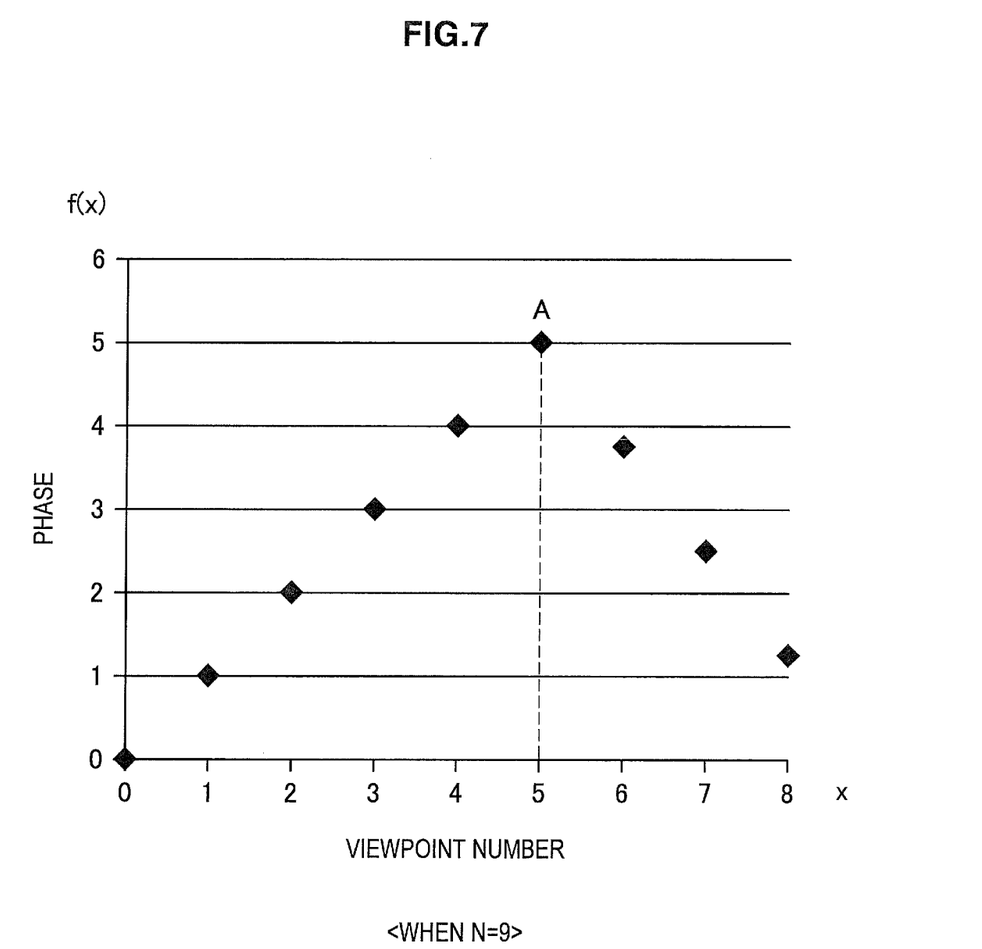
FIG. 7 is a graph illustrating phases at 9 respective viewpoints.

FIG. 6 illustrates phases for 8 respective viewpoints and FIG. 7 illustrates phases for 9 respective viewpoints. First, the largest phase viewpoint A for 8 viewpoints is calculated as 4 by the equation (1) above. As shown in FIG. 6, according to the equation (2) above, the phase for the viewpoints increases monotonously until the viewpoint number reaches the largest phase viewpoint A, that is 4, and decreases monotonously toward the viewpoint number 0 in the next normal vision region after the viewpoint number exceeds it. Similarly, the largest phase viewpoint A for 9 viewpoints is calculated as 5 by the equation (1) above. As shown in FIG. 7, according to the equation (2) above, the phase for the viewpoints increases monotonously until the viewpoint number reaches the largest phase viewpoint A, that is 5, and decreases monotonously toward the viewpoint number 0 in the next normal vision region after the viewpoint number exceeds it.

In other words, when the number of consecutive vertexes t is 1, the phase determining part 116 determines a phase at the viewpoint x exceeding the largest phase viewpoint A to be a value at an intersection of the viewpoint number x and the straight line connecting the phase at the largest phase viewpoint A and the phase at the viewpoint number 0 in the next normal vision region.

With reference to FIG. 5, an example where the viewpoint count is 9 and the phase difference p is set to 1 will be discussed. When the coefficient α is set, for example, to 0.4, the largest phase viewpoint A is 4. Thus, the phase for the viewpoint numbers 0 to 4, before the viewpoint number exceeds the largest phase viewpoint A, increases by the specified phase difference 1 each viewpoint number. For the viewpoint numbers 5 to 8 exceeding the largest phase viewpoint A, i.e. the viewpoint number 4, the phase at each viewpoint number x is a value at an intersection of the viewpoint number x and the straight line connecting the phase at the viewpoint number 4 and the phase at the viewpoint number 0 in the next normal vision region.

In the example of FIG. 5, the largest phase viewpoint A takes a largest value allowed when the coefficient α is set to 0.7. Then, the largest phase viewpoint A is 7. Thus, the phase for the viewpoint numbers 0 to 7, before the viewpoint number exceeds the largest phase viewpoint A, increases by the specified phase difference 1 each viewpoint number. The phase at the viewpoint number 8 is a value at an intersection of the viewpoint number x and the straight line connecting the phase at the viewpoint number 7 and the phase at the viewpoint number 0 in the next normal vision region. In this case, the phase at the viewpoint number 8 is half the phase at the largest phase viewpoint 7. The existence of a viewpoint at the viewpoint number 8 between the largest phase viewpoint A and the viewpoint number 0 of the next normal vision region reduces the phase difference between the neighboring viewpoint images, thus advantageously reducing the occurrence of twin images and blurring over related art.

In other words, in a process for setting the position of viewpoint images according to the present embodiment, the phase determining part 116 determines the phase of each viewpoint so that the phase difference between the neighboring viewpoint images is half or less of the phase at the largest phase viewpoint A. Then, the phase determining part 116 evenly allocates phases for individual viewpoints with the largest phase viewpoint A designated as a vertex so that the phase difference between the neighboring viewpoint images at each viewpoint becomes as uniform as possible. This idea holds true for phases at individual viewpoints determined by the above equations (1) and (2) where the arbitrary viewpoint count n and coefficient α are set.

With reference to FIG. 5, an example where the viewpoint count is 9 and the coefficient α is, for example, set to 0.7 will be discussed. At this time, the largest phase viewpoint A is 7 and the phase at the viewpoint number 8 is half the phase of the largest phase viewpoint (A=7), that is, 3.5. Thus, even with the largest phase viewpoint as 7, the phase differences between the viewpoint numbers 7 and 8 as well as 8 and 0 having the largest phase difference among neighboring viewpoint images are 3.5, which satisfies half or less of the phase of the largest phase viewpoint.

When the viewpoint count n is multiples of 2 as in the case of 8 viewpoints, a complete folding of phases for viewpoints x is possible at the largest phase viewpoint A, and, at that time, a viewpoint image having an identical phase appears two or more times. For example, as shown in FIG. 6, viewpoint images at viewpoint numbers 1 and 7, 2 and 6, and 3 and 5 have an identical phase each, symmetric with respect to the largest phase viewpoint A (viewpoint number 4). Consequently, for example, a viewpoint image at the viewpoint number 1 can be used as a viewpoint image for the viewpoint number 7. Thus, creating a single viewpoint image enables it to be used as a viewpoint image for other viewpoint numbers having an identical phase, decreasing the number of viewpoint images, leading to a reduction in the load of computation by the display processing unit 110.

Figure 8:
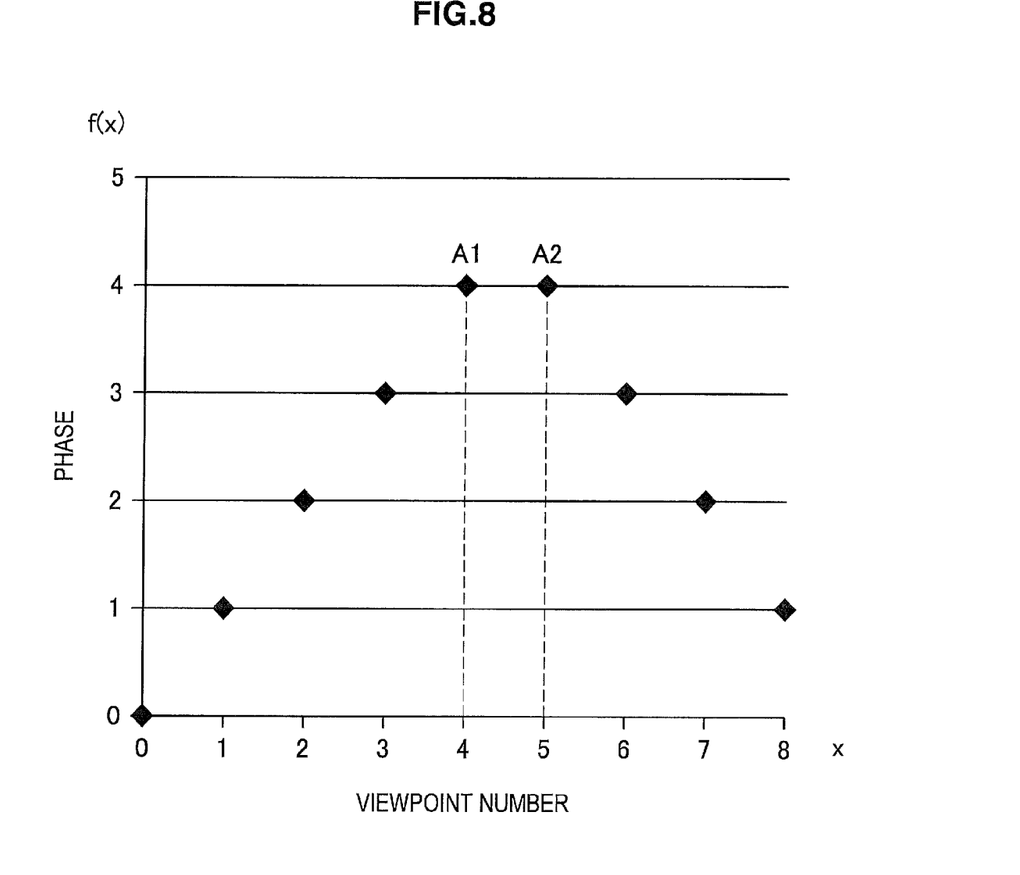
FIG. 8 is a graph illustrating phases at 9 respective viewpoints with the number of consecutive vertexes specified as 2.

Even when the viewpoint count is not multiples of 2 as in the case of 9 viewpoints, setting the number of consecutive vertexes t to 2 and then two largest phase viewpoints A1, A2 enables viewpoint images to be reused. Specifically, as shown in FIG. 8, two largest phase viewpoints A1, A2 are set at the viewpoint numbers 4, 5 to make consecutive viewpoints without phase difference at the vertex for folding. This allows viewpoint images having an identical phase to be used two or more times, the number of viewpoint images created by the display control part 118 to be decreased, and computing loads to be reduced. The present technology does not limit the number of consecutive vertexes t to 2. Any natural number from 2 to n−1−A may be set.

With reference back to FIG. 4, after phases for viewpoints have been determined at the step S120, the display control part 118 generates a signal for displaying a viewpoint image corresponding to the phase of each viewpoint and outputs the signal to the display unit 120. The display unit 120 is driven according to the signal to display each viewpoint image at respective phases so that a stereoscopic image with reduced discomfort is presented to a user.

A process of setting the position of viewpoint images by the image processing unit 110 according to the present embodiment has been explained so far. In the process, the image processing unit 110 sets the position of viewpoint images to make phase differences between any neighboring viewpoint images in a normal vision region almost uniform. This allows the reduced occurrence of twin images and blurring. Moreover, when a stereoscopic image is viewed from any viewpoint positions, the displacements of the viewpoint images are similar in degree. Thus, provision of a stereoscopic image that reduces a sense of discomfort and image degradation felt by a user is possible even when the stereoscopic image is viewed from different positions.

4. EXAMPLE

Figure 9:
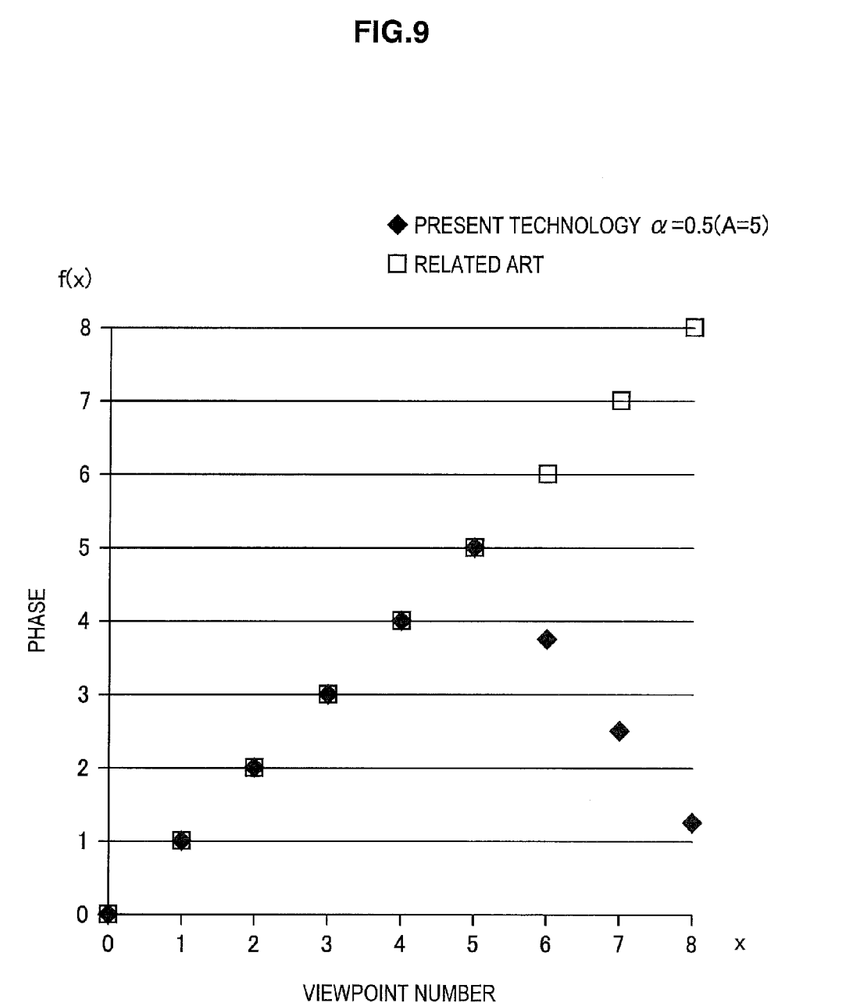
FIG. 9 is a graph illustrating phases for respective viewpoints according to the present embodiment and phases for respective viewpoints according to related art.
Figure 10:
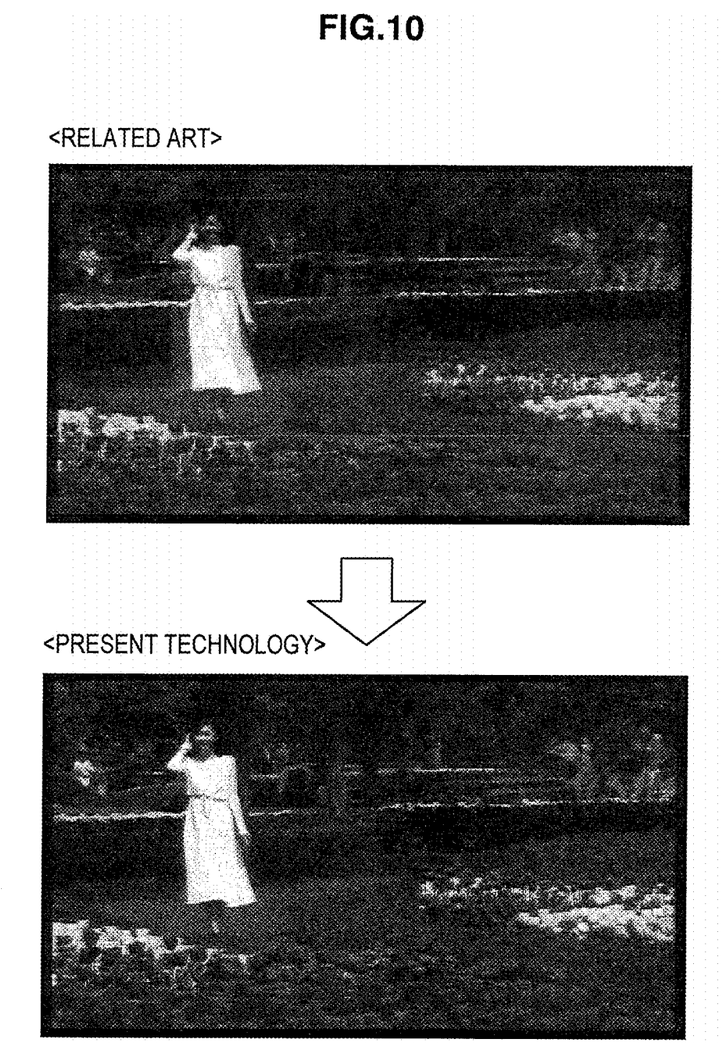
FIG. 10 shows an example of the appearances of a stereoscopic image according to the present embodiment and of a stereoscopic image according to the related art at the viewpoint 0 in the case of FIG. 9.

FIGS. 9 and 10 show an example of stereoscopic images presented by a naked-eye 3-D display 100 according to the present embodiment. FIG. 9 is a graph illustrating phases for respective viewpoints according to the present embodiment and phases for respective viewpoints according to related art. FIG. 10 shows an example of the appearances of a stereoscopic image according to the present embodiment and of a stereoscopic image according to the related art at the viewpoint 0 in the case of FIG. 9.

The naked-eye 3-D display 100 according to the present embodiment is a full-screen display apparatus, presenting viewpoint images in 9 viewpoints with the coefficient α set as 0.5 and the phase difference as 5 pixels. As shown in FIG. 9, the largest phase viewpoint A is 5, and according to the equation (2) above, the phase for the viewpoints is configured to increase monotonously until the viewpoint number reaches the largest phase viewpoint A, i.e. 5, and decrease monotonously toward the viewpoint number 0 in the next normal vision region after the viewpoint number exceeds it. In the related art, on the other hand, the phase for the 9 viewpoint images in the normal vision region increases monotonously as the viewpoint number x becomes larger, as shown in FIG. 9.

When viewpoint images having respective phases as in FIG. 9 are generated, stereoscopic images at the viewpoint 0, i.e. the end viewpoint of the normal vision region, are as shown in FIG. 10. In the related art, the correlation between the viewpoint images getting into the left eye and the right eye is lowest at the viewpoint number 0. Consequently, as shown in the upper side of FIG. 10, the person looks doubled and blurred.

In contrast, the naked-eye 3-D display 100 according to the present embodiment uses the image processing unit 110 shown in FIG. 4 to execute the process of setting the position of viewpoint images so that the phase difference between the viewpoint images getting into the left eye and the right eye even at the viewpoint 0 is similar to that of other viewpoint positions. This, as shown in the lower side of FIG. 10, advantageously reduces displacement and blurring of the person in the stereoscopic image over the related art. Thus, use of the technology according the present embodiment allows the provision of a stereoscopic image that reduces discomfort generated by image degradation resulting from a difference in phases between viewpoint images getting into the left and right eyes, even at an end viewpoint in a normal vision region.

5. CONCLUSION

The naked-eye 3-D display 100 according to the present embodiment and the process of setting the positions of viewpoint images thereby have been explained so far. According to the present embodiment, setting the position of viewpoint images so as to make phase differences between neighboring viewpoint images as uniform as possible enables image degradation to be less noticeable and a proper stereoscopic image to be viewed with the naked eye even in cases where a user watching the stereoscopic image moves his/her head. It is also capable of greatly reducing the appearance of a twin image and blurring in a stereoscopic image even at an end viewpoint so that a proper stereoscopic image is presented to a user.

In generating the viewpoint images, reuse of viewpoint images symmetric with respect to the largest phase viewpoint A is possible when the viewpoint count n is multiples of 2. This allows computing loads for generating viewpoint images to be lessened. Even when the viewpoint count n is not multiples of 2, setting a plurality of largest phase viewpoints A enables viewpoint images to be reused and thus computing loads for generating viewpoint images to be lessened.

Preferred embodiments of the present disclosure have been described in detail with reference to the appended drawings. Note that the present technology is not limited to the examples described above. It should be understood by those skilled in the art that various modifications, combinations, sub-combinations and alterations may occur depending on design requirements and other factors insofar as they are within the scope of the appended claims or the equivalents thereof.

For example, in the embodiment described above, the naked-eye 3-D display 100 includes the display processing unit 110. The present technology, however, is not limited to the example described above. For example, the function of the display processing unit 110 may be implemented by an external information processor having a CPU and results of the processing may be entered on the naked-eye 3-D display 100.

Additionally, the present technology may also be configured as below.

(1) A display processing apparatus including:
  a largest phase viewpoint determining part configured to determine a largest phase viewpoint having the largest phase among viewpoint images at a plurality of viewpoint positions in a normal vision region for presenting a stereoscopic image; and
  a phase determining part configured to determine phases for the viewpoint images at the respective viewpoint positions so that the phase differences between the viewpoint images at the neighboring viewpoint positions are half or less of the phase at the largest phase viewpoint.

(2) The display processing apparatus according to (1),
  wherein the phase determining part determines phases for the viewpoint images at the respective viewpoint positions so that respective absolute values of the phase differences between the viewpoint images at the neighboring viewpoint positions are equal or zero.

(3) The display processing apparatus according to (1) or (2),
  wherein the phase determining part determines respective phases for the viewpoint images at the viewpoint positions other than the largest phase viewpoint in the normal vision region by setting the largest phase viewpoint as a vertex so that the phase differences between the viewpoint images at the neighboring viewpoint positions are equal.

(4) The display processing apparatus according to any one of (1) to (3), further including:
  a display control part configured to generate the viewpoint images having respective phases determined by the phase determining part and to let a display unit display the viewpoint images,
  wherein, when a number of the viewpoint positions is multiples of 2,
    the largest phase viewpoint determining part determines the position of the largest phase viewpoint at about the center of the viewpoint positions arranged in one direction in the normal vision region,
    the phase determining part determines respective phases for the viewpoint images at the viewpoint positions so that the phases of the viewpoint images at the viewpoint positions located at a same distance from the largest phase viewpoint are identical, and
    the display control part generates either one of the viewpoint images having an identical phase.

(5) The display processing apparatus according to any one of (1) to (3), further including:
  a display control part configured to generate the viewpoint images having respective phases determined by the phase determining part and to let a display unit display the viewpoint images,
  wherein, when the number of the viewpoint positions is not multiples of 2,
    the largest phase viewpoint determining part determines the position of a plurality of the largest phase viewpoints having the same phase for the consecutive viewpoint positions at about the center of the viewpoint positions arranged in one direction in the normal vision region,
    the phase determining part determines respective phases for the viewpoint images at the viewpoint positions so that the phases of the viewpoint images at the viewpoint positions located at a same distance from the largest phase viewpoint are identical, and
    the display control part generates either one of the viewpoint images having an identical phase.

(6) The display processing apparatus according to any one of (1) to (5),
  wherein a position of the start viewpoint in the normal vision region is determined in response to the position of a user watching the stereoscopic image to be presented.

(7) A display apparatus including:
  a largest phase viewpoint determining part configured to determine a largest phase viewpoint having the largest phase among viewpoint images at a plurality of viewpoint positions in a normal vision region for presenting a stereoscopic image;
  a phase determining part configured to determine phases for the viewpoint images at the respective viewpoint positions so that the phase differences between the viewpoint images at the neighboring viewpoint positions are half or less of the phase at the largest phase viewpoint;
  a display control part configured to generate the viewpoint images having respective phases determined by the phase determining part and to let the display unit display the viewpoint images; and
  a display unit configured to display the viewpoint images.

(8) A method of processing display, the method including:
  determining a largest phase viewpoint having the largest phase among viewpoint images at a plurality of viewpoint positions in a normal vision region for presenting a stereoscopic image; and
  determining phases for the viewpoint images at the respective viewpoint positions so that the phase differences between the viewpoint images at the neighboring viewpoint positions are half or less of the phase at the largest phase viewpoint.

What is claimed is:

1. A display processing apparatus comprising:
a largest phase viewpoint determining part configured to determine a largest phase viewpoint having the largest phase among viewpoint images at a plurality of viewpoint positions in a normal vision region for presenting a stereoscopic image;
a phase determining part configured to determine phases for the viewpoint images at the respective viewpoint positions so that phase differences between the viewpoint images at neighboring viewpoint positions are half or less of the phase at the largest phase viewpoint; and
a display control part configured to generate the viewpoint images having respective phases determined by the phase determining part and to let a display unit display the viewpoint images,
wherein, when a number of the viewpoint positions is multiples of 2,
(a) the largest phase viewpoint determining part determines the position of the largest phase viewpoint at about the center of the viewpoint positions arranged in one direction in a normal vision region,
(b) the phase determining part determines respective phases for the viewpoint images at the viewpoint positions so that the phases of the viewpoint images at the viewpoint positions located at a same distance from the largest phase viewpoint are identical, and
(c) the display control part generates either one of the viewpoint images having an identical phase.

2. The display processing apparatus according to claim 1, wherein the phase determining part determines phases for the viewpoint images at the respective viewpoint positions so that respective absolute values of the phase differences between the viewpoint images at the neighboring viewpoint positions are equal or zero.

3. The display processing apparatus according to claim 1, wherein the phase determining part determines respective phases for the viewpoint images at the viewpoint positions other than the largest phase viewpoint in the normal vision region by setting the largest phase viewpoint as a vertex so that the phase differences between the viewpoint images at the neighboring viewpoint positions are equal.

4. The display processing apparatus according to claim 1, wherein a position of the start viewpoint in the normal vision region is determined in response to the position of a user watching the stereoscopic image to be presented.

5. A display processing apparatus comprising:
a largest phase viewpoint determining part configured to determine a largest phase viewpoint having the largest phase among viewpoint images at a plurality of viewpoint positions in a normal vision region for presenting a stereoscopic image;
a phase determining part configured to determine phases for the viewpoint images at the respective viewpoint positions so that phase differences between the viewpoint images at neighboring viewpoint positions are half or less of the phase at the largest phase viewpoint; and
a display control part configured to generate the viewpoint images having respective phases determined by the phase determining part and to let a display unit display the viewpoint images,
wherein, when the number of the viewpoint positions is not multiples of 2,
(a) the largest phase viewpoint determining part determines the position of a plurality of the largest phase viewpoints having the same phase for the consecutive viewpoint positions at about the center of the viewpoint positions arranged in one direction in a normal vision region,
(b) the phase determining part determines respective phases for the viewpoint images at the viewpoint positions so that the phases of the viewpoint images at the viewpoint positions located at a same distance from the largest phase viewpoint are identical, and
(c) the display control part generates either one of the viewpoint images having an identical phase.

6. A display apparatus comprising:
a largest phase viewpoint determining part configured to determine a largest phase viewpoint having the largest phase among viewpoint images at a plurality of viewpoint positions in a normal vision region for presenting a stereoscopic image;
a phase determining part configured to determine phases for the viewpoint images at the respective viewpoint positions so that the phase differences between the viewpoint images at the neighboring viewpoint positions are half or less of the phase at the largest phase viewpoint;
a display control part configured to generate the viewpoint images having respective phases determined by the phase determining part and to let the display unit display the viewpoint images; and
a display unit configured to display the viewpoint images,
wherein, when a number of the viewpoint positions is multiples of 2,
(a) the largest phase viewpoint determining part determines the position of the largest phase viewpoint at about the center of the viewpoint positions arranged in one direction in a normal vision region,
(b) the phase determining part determines respective phases for the viewpoint images at the viewpoint positions so that the phases of the viewpoint images at the viewpoint positions located at a same distance from the largest phase viewpoint are identical, and
(c) the display control part generates either one of the viewpoint images having an identical phase.

7. A method of processing display, the method comprising:
determining a largest phase viewpoint having the largest phase among viewpoint images at a plurality of viewpoint positions in a normal vision region for presenting a stereoscopic image;
determining phases for the viewpoint images at the respective viewpoint positions so that the phase differences between the viewpoint images at the neighboring viewpoint positions are half or less of the phase at the largest phase viewpoint; and
generating a viewpoint image,
wherein, when a number of the viewpoint positions is multiples of 2,
(a) the largest phase viewpoint determining includes determining the position of the largest phase viewpoint at about the center of the viewpoint positions arranged in one direction in a normal vision region,
(b) the phase determining including determining respective phases for the viewpoint images at the viewpoint positions so that the phases of the viewpoint images at the viewpoint positions located at a same distance from the largest phase viewpoint are identical, and (c) generating the viewpoint image includes generating one of the viewpoint images having an identical phase.

\* \* \* \* \*